United States Patent [19]

Nishiyama et al.

[11] Patent Number: 4,644,424
[45] Date of Patent: Feb. 17, 1987

[54] EQUALIZER USED FOR MAGNETIC STORAGE DEVICE

[75] Inventors: Nobumasa Nishiyama, Hachioji; Hajime Aoi, Tachikawa; Takashi Tamura; Yasuhide Ouchi, both of Kokubunji; Makoto Saitou, Tokyo, all of Japan

[73] Assignee: Hitachi, Ltd., Tokyo, Japan

[21] Appl. No.: 685,118

[22] Filed: Dec. 21, 1984

[30] Foreign Application Priority Data

Dec. 26, 1983 [JP] Japan .................................. 58-243839

[51] Int. Cl.⁴ ........................... G11B 5/02; H04B 3/14; H03H 11/06
[52] U.S. Cl. ..................................... 360/65; 333/28 R
[58] Field of Search .............. 360/65; 333/28 R, 28 T

[56] References Cited

U.S. PATENT DOCUMENTS 3,927,420 12/1975 Hayashi et al. ........................ 360/65
4,266,204 5/1981 Jacoby ............................. 333/28 R
4,456,893 6/1984 Otani ........................... 333/28 R X
4,491,808 1/1985 Saito ............................. 333/28 R

OTHER PUBLICATIONS

IBM-TDB C. E. Schlaepfer vol. 16, No. 8, 1/74 Pulse Filter with Pulse Asymmetry Correction.
IBM-TDB R. L. Comstock and C. C. Lin vol. 20, No. 1, Adaptive Equalizer for Read Channel, 6/77.

Primary Examiner—Raymond F. Cardillo
Assistant Examiner—Alyssa H. Bowler
Attorney, Agent, or Firm—Antonelli, Terry & Wands

[57] ABSTRACT

An equalizer equalizes a reproduced waveform reproduced by a thin film magnetic head by reproducing information recorded magnetically on a medium. In the equalizer, the reproduced waveform is delayed to a position of an undershot portion, and is attenuated to an amplitude corresponding to a magnitude of the undershot portion, and the resultant waveform is superposed on the reproduced waveform, to thereby eliminate the undershot portion. Furthermore, by superposing a waveform obtained by inverting the reproduced waveform and amplifying or attenuating the inverted waveform, on the reproduced waveform at a half power position thereof, the width is narrowed.

14 Claims, 16 Drawing Figures

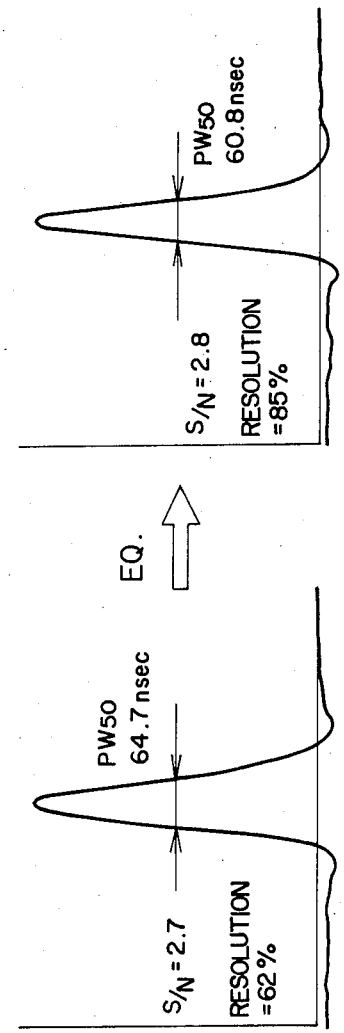

EQUALIZER USED FOR MAGNETIC STORAGE DEVICE

BACKGROUND OF THE INVENTION

The present invention relates to an equalizer for a reproduced waveform of a digital magnetic recording, and in particular, relates to an equalizer for a reproduced waveform reproduced by the use of a thin film head, wherein the equalizer is suitable to eliminate undershot portions of the reproduced waveform, and further suitable to reduce the width of an isolated pulse waveform to thereby improve the resolution equivalently.

In digital magnetic storage devices, much efforts have been made year by year to increase capacity and areal recording density, and in order to achieve the higher areal recording density, approaches have been taken for a higher bit density and a higher track density. Among these, in particular, to promote the higher bit density, thin film heads have been put in practical use.

The thin film head 1 is schematically illustrated in FIG. 1. Generally, in the thin film head, as distinguished from conventional bulk heads, a pole face 47 (a face in an opposed relationship to a recording medium 4) has a limited width with respect to a magnetic transition interval within the recording medium, and thus as shown in FIG. 2, peculiar negative peaks appear in an isolated reproduced waveform.

FIG. 2 shows an isolated pulse waveform 6 when information is recorded on and reproduced from a recording medium with a thin film magnetic head having a thick pole face 47. This waveform 6, as contrasted with an isolated pulse waveform 49 which is a reproduced waveform of information recorded with a thin film head having a thin pole face, has undershot portions at positions 7, spaced from a main peak 48. As a result, an output signal frequency response characteristic 8 of the thick pole face head, as compared with an output signal frequency response characteristic 50 of the thin pole face head, has a wave-like change from a lower recording frequency as shown in FIG. 3 (refer to A. Kakei, M. Oshiki, T. Aikawa, M. Sasaki, T. Kozai, IEEE Trans. Magn., MAG-18, 1131 (1982)). Further, as shown in FIG. 4, a pattern peak shift 9 of the thick pole face head is large as compared with a patter peak shift 51 of the thin pole face head. Further, the pattern peak shift characteristic 9 in case of the thick pole face head has a wave-like change as the frequency increases in contrast to that in case of the thin pole face head.

Therefore, from the view point of the reproducing characteristics such as the frequency response and the pattern peak shift, the thinner pole face length is desirable.

On the contrary, from the view point of the recording characteristics, a small sectional area of a thin film head 1 at a stepped portion 5 causes a limiting factor of the recording magnetic field.

Therefore, a sufficient write field 3 can not be obtained due to the fact that magnetic flux passing through the pole piece layer is limited by magnetic saturation at this stepped portion 5. For this reason, in order to produce a sufficient write field, it is required to increase the sectional area of the pole piece layer at stepped portion 5 of the thin magnetic head and this will result in an increase in the thickness of the pole face 47.

As above mentioned, it is necessary to select the pole face length satisfying the frequency response and the recording field strength simultaneously in designing thin film heads and it becomes more severe in higher bit density.

SUMMARY OF THE INVENTION

It is an object of the present invention to provide an equalizer which eliminates by a circuit arrangement thereof undershot portions caused in an isolated pulse waveform, and which produces a waveform having equivalently no undershot portions.

It is another object of the present invention to provide an equalizer which produces a reproduced waveform suitable to achieve higher bit density by narrowing the width of the isolated pulse waveform.

To achieve these objects, in the present invention, a reproduced waveform is delayed to a position of an undershot portion, and the delayed reproduced waveform is attenuated to an amplitude corresponding to the magnitude of the undershot portion and is superposed on the original reproduced waveform thereby to eliminate the undershot portion. Furthermore, according to another features of the present invention, by forming a waveform formed by inverting the isolated pulse waveform and amplifying or attenuating the inverted waveform and by superposing the formed waveform on the isolated pulse waveform at a position in which the magnitude of the isolated pulse waveform is substantially equal to a half power, a resultant waveform wherein the width of the isolated pulse waveform is narrowed provided.

BRIEF DESCRIPTION OF THE DRAWINGS

FIGS. 11A and 11B are respectively input waveform and output waveform of the equalizer of FIG. 9.

DESCRIPTION OF THE PREFERRED EMBODIMENTS

Figure 1:
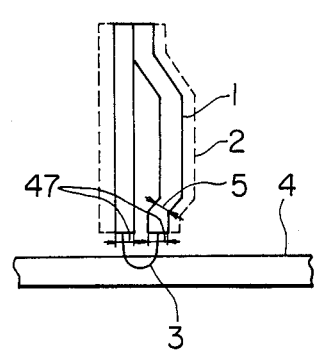
FIG. 1 is a schematic sectional view of a thin film head.
Figure 2:
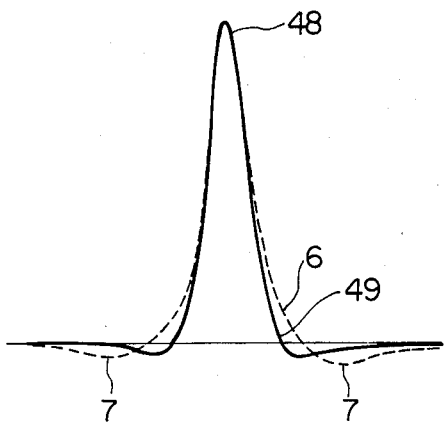
FIG. 2 is a diagram showing an example of an isolated pulse waveform reproduced by the thin film head of FIG. 1.
Figure 3:
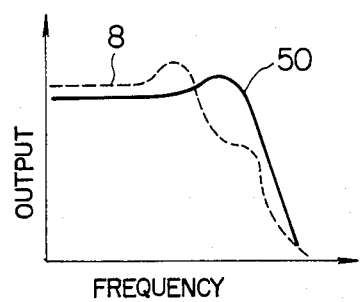
FIG. 3 is a graph of the frequency response characteristic of the heads, of which the isolated pulse waveforms are shown in FIG. 2.
Figure 4:
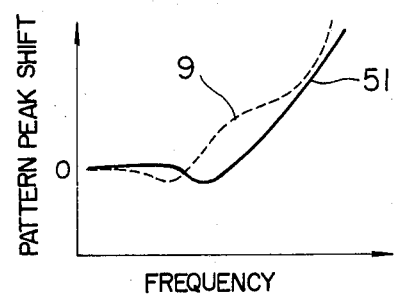
FIG. 4 is a graph of the pattern peak shift characteristic of the heads, of which isolated waveforms are shown in FIG. 2.
Figure 5:
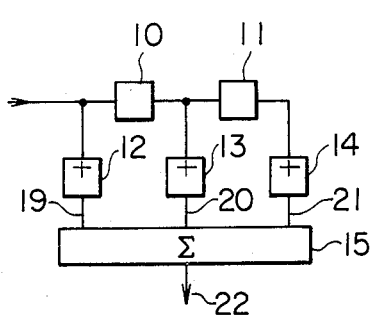
FIG. 5 is a block diagram of an equalizer of one embodiment according to the present invention.
Figure 6:
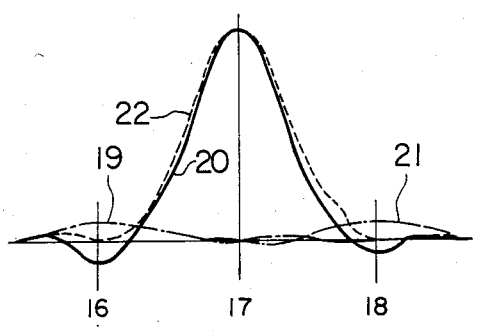
FIG. 6 is a diagram of input and output waveforms for explaining the operation of the equalizer of FIG. 5.
Figure 7:
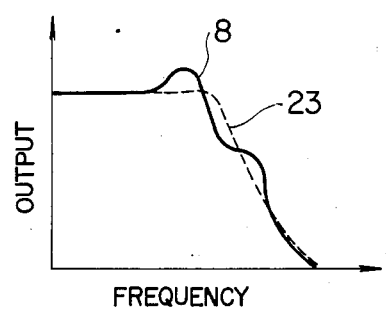
FIGS. 7 and 8 are graphs of the frequency response characteristic and the pattern peak shift characteristic respectively, for explaining advantageous effects of the equalizer of FIG. 5.
Figure 8:
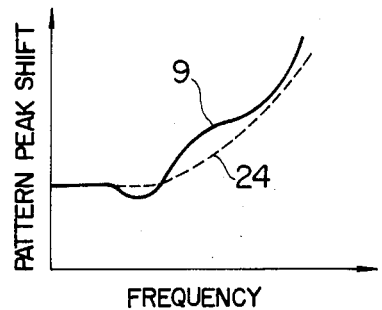

With reference to FIG. 5, an embodiment of the present invention will be described. In order to eliminate undershot portions in an isolated pulse waveform, an equalizer with taps shown in FIG. 5 is employed. The equalizer is comprised of time delay elements or time delay circuits 10 and 11 for delaying a reproduced signal, attenuator elements or circuits 12, 13 and 14 for determining amplitudes and phases at respective taps, and a summing circuit 15 for superposing output signals from the respective taps. The operation of the equalizer will be described referring to FIG. 6. In the time delay element 10, there is set a delay time corresponding to a time difference between a position 16 at which an undershot portion becomes large and a position 17 at which the reproduced waveform assumes a maximum amplitude, and in the time delay element 11 a delay time corresponding to a time difference between the position 17 and a position 18 at which an undershot portion on the other side becomes large is set. The attenuator 12 is set so that the amplitude of a signal 19 corresponds to the magnitude of the undershot portion at the position 16. The attenuator 13 is usually set to have a gain equal to unity. The attenuator 14 is set similarly. As a result, by superposing the output signals 19, 20 and 21 from respective taps, a reproduced waveform 22 having no undershot portions can be obtained. FIGS. 7 and 8 show graphs indicating advantageous effects of the embodiment, and in which the effects of the embodiment are contrasted to that in a case wherein the equalizer is not used to deal with the reproduced waveform from a thick pole face head. Curves 23 and 24 in dashed lines respectively show the frequency response characteristic and the pattern peak shift characteristic obtained by using the equalizer of the present embodiment.

Since the waveform 22 (FIG. 6) after dealing with the waveform includes no undershot portions, the frequency response characteristic 23 and the pattern peak shift characteristic 24 become close to the characteristics of a bulk head having a large pole length. However, since the width of the waveform 22 is narrow as compared with the one reproduced by the bulk head, recording and reproducing characteristics suitable for high density recording can be obtained in which the resolution is high and the pattern peak shift is also small as compared with the bulk head.

Figure 9:
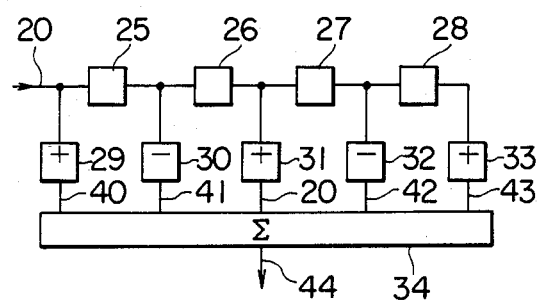
FIG. 9 is a block diagram of an equalizer of another embodiment of the present invention.
Figure 10:
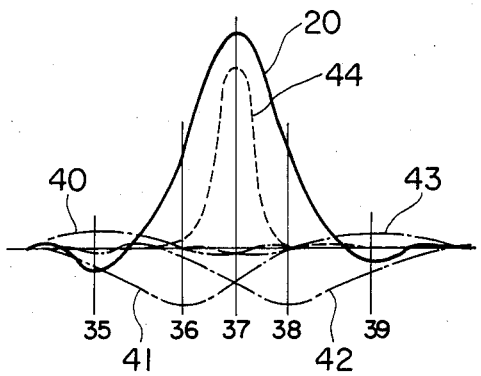
FIG. 10 is a diagram of input and output waveforms for explaining the operation of the equalizer of FIG. 9.

Next, referring to FIG. 9, another embodiment to eliminate the undershot portions and to narrow the width of the reproduced waveform will be described. The reference numerals 25, 26, 27 and 28 designate time delay elements or time delay circuits, and the numerals 29, 30, 31, 32 and 33 designate attenuator elements for determining amplitudes and phases at respective taps, and the numeral 34 designates a summing element for summing signals obtained at respective taps, which signals have passed through the respective attenuators 29-33. In this embodiment, the undershot portions are eliminated similarly to the embodiment described in the foregoing by applying at positions 35 and 39 of the undershot portions of an input waveform 20, respective signals 40 and 43 which have been formed by delaying and adjusting the amplitudes by the attenuators 29 and 33 to the magnitudes of the undershot portions. Further, at positions 36 and 38 corresponding to both bases, or substantially half power positions of a main peak of the input waveform 20, respective waveforms 41 and 42 which have amplitudes suitably set by the attenuators 30 and 32 respectively connected to the outputs of the time delay elements 25 and 27 are produced, and the produced waveforms 41 and 42 are subtracted from the input waveform 20. As a result of this, an output waveform 44 having no undershot portions and having a narrow half pulse width can be obtained.

FIGS. 11A and 11B respectively show examples of the input waveform and the resultant output waveform after the equalization. To fill up the undershot portions of the input waveform, based on the conditions mentioned above, a total delay time by the time delay elements 25 and 26 (27 and 28), i.e., $(J_1+J_2)$ is made 75 msec. and the attenuation coefficient of the attenuator 29 (33) is made 0.06. To achieve the effect of narrowing the waveform width, the subtracting position of the produced waveforms (e.g., 41, 42) from the original input waveform and the amplitude of the produced waveforms (41, 42) are important parameters.

Figure 12A:
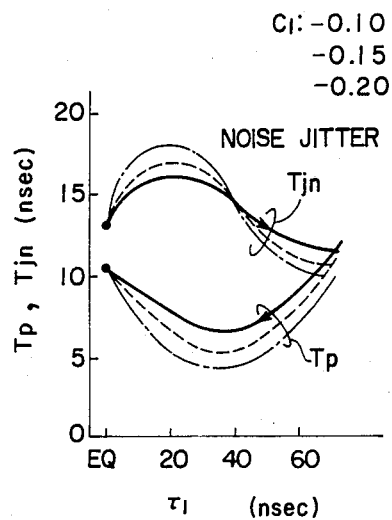
FIG. 12A is a graph of the noise jitter characteristic and the pattern peak shift characteristic of the equalizer of FIG. 9.
Figure 12B:
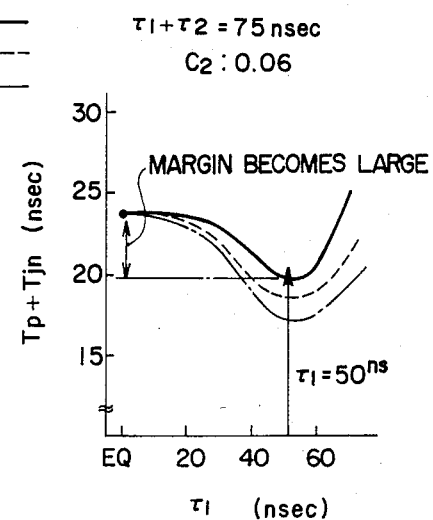
FIG. 12B is a graph of a combined characteristic of the noise jitter characteristic and the pattern peak shift characteristic of FIG. 12A.

FIG. 12A shows a relationship between noise jitter $(T_{jN})$ and pattern peak shift (Tp) which relate to the operation margin of an associated apparatus to a great extent, when the coefficients $\tau_1$ and $C_1$ of respective time delay element 26 and attenuator 30 are varied as shown in the figure. Since the noise jitter and the pattern peak shift are affected by the parameter $\tau_1$ inversely to each other, a sum of both varies as shown in FIG. 12B. In this figure, the operation margin of the associated apparatus becomes maximum under an optimum condition in which the sum $(T_{jN}+Tp)$ of the noise jitter and the pattern peak shift is minimum. As shown in the figure, for the parameter $\tau_1$, the optimum condition is obtained when $\tau_1=50$ ns, and for $C_1$, the sum $(T_{jN}+Tp)$ becomes small when the absolute value of $C_1$ is larger in a range of $-0.1$ to $-0.2$. However, since a new undershot portion is caused in the waveform after the equalization under a condition in which $C_1$ is equal to or less than $-0.15$, if the coefficient $C_1$ is selected from a range wherein no undershot portion is caused, $C_1$ is optimum when $C_1=-0.1$.

However, if undesirable effects of the new undershot portion, such as shoulder noise, are possible to be eliminated, $C_1$ should be selected to be lower than $-0.1$.

Figure 13:
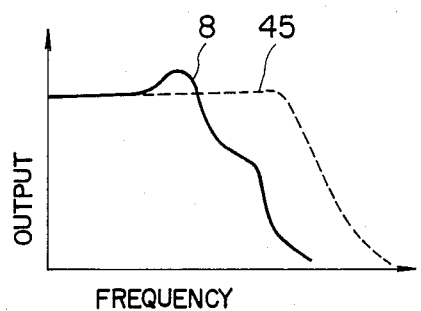
FIGS. 13 and 14 are graphs of the frequency characteristic and the pattern peak shift characteristic, respectively, for explaining advantageous effects of the equalizer of FIG. 9.
Figure 14:
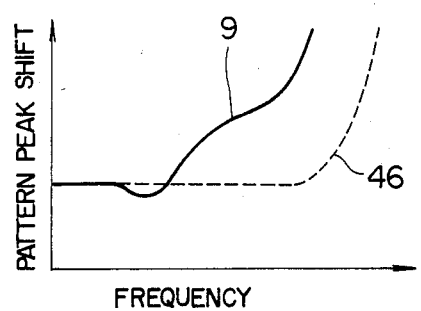

FIGS. 13 and 14 show advantageous effects in the embodiment, and these effects are contrasted to that in a case wherein no equalizer is used after reproduction by a thicker pole face head. In FIGS. 13 and 14, curves in dashed lines respectively show a frequency characteristic 45 and a pattern peak shift characteristic 46 obtained by using the qualizer of the embodiment.

In the present invention, the undershot portions caused in the isolated reproduced waveform when the thin film head is used can be eliminated without enlarging the width of the reproduced waveform, and further the width of the reproduced waveform can be narrowed. As a result, it becomes possible to compensate for the insufficient write field which is a drawback in the thin film head by increasing the thickness of the head pole face, and further it becomes possible to achieve the high recording density by using a medium with high coercivity which has a capability of high density recording, and by using a thicker pole face thin film head in combination with the medium with high coercivity.

We claim:

1. An equalizer for use in a magnetic storage device which reproduces by a thin film magnetic head a reproduced signal waveform of information magnetically recorded on a medium, said equalizer comprising:

first means for attenuating said reproduced signal waveform by a predetermined amount;

second means for delaying said reproduced signal waveform by a predetermined time;

third means for attenuating an output signal of said second means by a predetermined amount;

fourth means for delaying the output signal of said second means by a predetermined time;

fifth means for attenuating an output signal of said fourth means by a predetermined amount;

sixth means for delaying the output signal of said fourth means by a predetermined time;

seventh means for attenuating an output signal of said sixth means by a predetermined amount;

eighth means for delaying the output signal of said sixth means by a predetermined time;

ninth means for attenuating an output signal of said eighth means by a predetermined amount; and tenth means for summing outputs of said first, fifth and ninth means and for subtracting outputs of said third and seventh means, to thereby eliminate undershot portions of said reproduced signal waveform and at the same time to narrow the width of said waveform.

2. An equalizer according to claim 1, wherein said first means and ninth means attenuate a maximum amplitude of said reproduced signal waveform to a magnitude equal to a maximum amplitude of one and the other of the undershot portions of said waveform, respectively.

3. An equalizer according to claim 1, wherein said second and eighth means delay said reproduced signal waveform by the predetermined time so that a maximum amplitude one and the other of the undershot portions of said reproduced signal waveform coincides with a maximum amplitude of the output waveform of said first means and the ninth means, respectively.

4. An equalizer according to claim 1, wherein said fourth and sixth means delay said reproduced signal waveform by the predetermined times so that a maximum amplitude of the output waveform of said third and seventh means substantially coincides with half power positions of said reproduced waveform.

5. An equalizer according to claim 1, wherein said third means and seventh means attenuate said reproduced signal waveform so that a sum of noise jitter and pattern peak shift of an output waveform of said tenth means is minimum.

6. An equalizer for use in a magnetic storage device which reproduces by a thin film magnetic head a reproduced signal waveform of information magnetically recorded on a medium, the reproduced signal waveform having undershot portions, said equalizer comprising:

first means for attenuating said reproduced signal waveform by a predetermined amount;

second means for delaying said reproduced signal waveform by a predetermined time;

third means for delaying said reproduced signal waveform by a predetermined amount and attenuating the same, and fourth means for summing outputs from said first, second and third means to eliminate undershot portions of said reproduced signal waveform;

said first means attenuating a magnitude of said reproduced signal waveform so as to correspond to a magnitude of one of the undershot portions of the output of said second means;

said second means delaying said reproduced signal waveform so that the one of the undershot portions of said reproduced signal waveform and an amplitude of the output waveform of said first means coincide with each other; and said third means delaying said reproduced signal waveform so that another of the undershot portions of said reproduced signal waveform and an amplitude of the output waveform of said second means coincide with each other and attenuating a magnitude of said delayed reproduced signal waveform delayed by said third means so as to correspond to a magnitude of the other of the undershot portion of output of said second means.

7. An equalizer according to claim 6, wherein said second means comprises attenuating means for attenuating said reproduced signal waveform delayed by said second means.

8. An equalizer according to claim 7, wherein said attenuating means of said second means controls a magnitude of said reproduced signal waveform delayed by said second means.

9. An equalizer according to claim 6, wherein said third means delays said reproduced signal waveform delayed by said second means.

10. An equalizer according to claim 6, wherein said second means includes fifth means for delaying said reproduced signal waveform by the predetermined time and sixth means for attenuating the output waveform of said fifth means by a predetermined amount, said third means including seventh means for delaying the output waveform of said fifth means by the predetermined time and eighth means for attenuating the output waveform of said seventh means by the predetermined amount, said fourth means summing the outputs from said first, sixth and eighth means to thereby eliminate undershot portions of said reproduced signal waveform.

11. An equalizer for use in a magnetic storage device which reproduces by a thin film magnetic head a reproduced signal waveform of information magnetically recorded on a medium, the reproduced signal waveform having undershot portions, said equalizer comprising:

first means for generating a signal waveform which corresponds to a signal obtained by inverting undershot portions of said reproduced signal waveform reproduced by said thin film magnetic head;

second means for generating a signal waveform which corresponds to a signal obtained by inverting said reproduced signal waveform so as to decrease a width of said reproduced signal waveform; and third means for superimposing said signal waveforms generated by said first and second means on said reproduced signal waveform at a predetermined phase position of said reproduced signal waveform so as to provide a signal waveform having the undershot portions of said reproduced signal waveform eliminated.

12. An equalizer according to claim 11, wherein said first means includes fourth means for attenuating said reproduced signal waveform by a predetermined amount, and fifth means for delaying said reproduced signal waveform by a predetermined amount and for attenuating the same by a predetermined amount.

13. An equalizer according to claim 11, wherein said second means includes fourth means for generating a signal waveform which is obtained by inverting a signal waveform formed by delaying said reproduced signal waveform by a predetermined amount and attenuating the same by a predetermined amount, and fifth means for generating a signal waveform which is obtained by inverting a signal waveform formed by delaying said reproduced signal waveform by a predetermined amount and attenuating the same by a predetermined amount.

14. An equalizer according to claim 11, wherein said third means includes fourth means for delaying said reproduced signal waveform by a predetermined amount, and fifth means for summing output signal waves of said first, second and fourth means.

* * * * *